United States Patent Office 3,840,590
Patented Oct. 8, 1974

3,840,590
ALKANOIC ACID RECYCLE SYSTEM IN PROCESS FOR CATALYTIC PRODUCTION OF AN ALKENYL ALKANOATE FROM AN ALKENE AND AN ALKANOIC ACID
Gene J. Fisher and Edward N. Wheeler, Corpus Christi, Tex., assignors to Celanese Corporation, New York, N.Y.
No Drawing. Continuation-in-part of abandoned application Ser. No. 109,046, Jan. 22, 1971. This application Sept. 12, 1972, Ser. No. 288,467
Int. Cl. C07c 67/04, 67/06
U.S. Cl. 260—497 A          8 Claims

ABSTRACT OF THE DISCLOSURE

In a process for producing an alkenyl alkanoate such as vinyl acetate by passing an alkene such as ethylene together with an alkanoic acid and molecular oxygen over a nobel metal catalyst, followed by recovering a crude alkenyl alkanoate fraction and a fraction comprising the alkanoic acid and high-boiling reaction by-products from the reactor effluent, the alkanoic acid is recovered from the alkanoic acid-containing fraction just named by countercurrently stripping it with a heated mixture comprising the alkene and alkanoic acid prepared by vaporizing the alkanoic acid in the presence of a gas comprising some or all of the alkene which is to be introduced into the catalytic reactor. The countercurrent stripping is preferably accomplished in a stripping tower which is surmounted by a rectification section into the top of which is introduced fresh alkanoic acid free of the high-boiling by-products of the alkenyl alkanoate synthesis reaction.

Related Patent Applications

This is a continuation-in-part of patent application Ser. No. 109,046, filed Jan. 22, 1971, and now abandoned.

Background of the Invention

This invention relates to the production of unsaturated esters by the catalytic reaction of an olefin and a carboxylic acid by a process which comprises passing the olefin and the acid, in admixture with molecular oxygen, over a catalyst comprising a noble metal, e.g. palladium. In particular it relates to the production of vinyl acetate from ethylene and acetic acid in admixture with molecular oxygen in the presence of a solid catalyst comprising a noble metal. More specifically it relates to a method for economically separating high-boiling reaction by-products from unconverted acetic acid or other alkanoic acid which is contained in the reactor effluent and which it is desired to recycle to the reactor substantially free from such high-boiling by-products.

Recently-developed processes for reacting ethylene, acetic acid, and molecular oxygen in the presence of a solid catalyst comprising a noble metal include those described in British Pat. No. 1,163,850 and U.S. Pats. Nos. 3,190,912 and 3,275,680. The catalyst typically comprises a nobel metal, e.g. a Group VIII nobel metal or a salt or oxide thereof, including especially palladium or rhodium. British Pat. 1,163,850 deals with an improved catalyst comprising metallic palladium and metallic gold, and this patent and U.S. Pat. 3,275,680 describe a mode of operation in which, in addition to the noble metal, an alkali metal acetate is present in the catalyst system. Advantageously the catalyst is disposed on a support such as an aluminum oxide-bentonite composition, alumina, or carbon.

A particularly favorable mode of operation in the above-described processes comprises passing a vapor-phase mixture comprising ethylene, acetic acid, and molecular oxygen at elevated temperature and pressure through a catalytic converter containing a bed of the solid catalyst, typically in the form of beads comprising a support material impregnated with one or more noble metals, with an alkali metal acetate also being present. The gaseous reaction product discharged from the converter contains vinyl acetate, unconverted acetic acid and ethylene, lesser quantities of unconverted oxygen, and inert fixed gases such as carbon dioxide and nitrogen. Acetaldehyde may also be present.

The reactor effluent gas just described is separated, by methods which are conventional but which are not pertinent to the present invention, into a recycle gas stream comprising the unreacted ethylene and at least a portion of the other fixed gases and a crude liquid product cut comprising unreacted acetic acid as well as the vinyl acetate and other liquefiable reaction by-products. The vinyl acetate and such volatile by-products as acetaldehyde and methyl and ethyl acetates are separated from the acetic acid by, for example, a water-azeotropic distillation, as described in U.S. Pat. 3,551,299, in which the vinyl acetate is recovered as an azeotropic distillate while the acetic acid is recovered as distillation residue. U.S. Pat. 3,458,406 deals with additional distillation processing by which the vinyl acetate is further purified.

The residue from the azeotropic distillation just described comprises predominantly acetic acid, which it is desired to recycle to the vinyl acetate converter for further reaction. Typically the acetic acid being incorporated into the vinyl acetate converter inlet streams is vaporized by being contacted, at a suitably controlled temperature, with part or all of the ethylene-containing stream of fixed gases which is also being forwarded to the converter as described in U.S. Pat. 3,190,912. Final composition of the resulting vapor-phase mixture is, of course, adjusted as desired by incorporating molecular oxygen thereinto, either before or after vaporization of the acetic acid. Alternatively, the prior art has considered simply vaporizing the acetic acid in a flash evaporator, with the resulting vapor being then mixed with ethylene and molecular oxygen.

Although distillation of the product mixture withdrawn from the vinyl acetate converter is referred to in U.S. Pat. 3,275,680, for the purpose of removing reaction products therefrom before recycling the acetic acid components to the vaporization step just discussed, there are two problems inherent in carrying out such a distillation by conventional methods, for which a simple and effective solution has heretofore been lacking. First, the reaction by-products include high-boiling compounds the separation of which from acetic acid without either using still temperatures so high as to cause product contamination or else using vacuum distillation with its attendant high cost is difficult at best. Second, it has now been discovered that, in addition to high-boilers which are of low volatility but not otherwise troublesome, there are also present in the converter reaction product materials which, as well as being of low volatility, are also polymerizable. One of these is acetoxyvinyl acetate. Other polymerizable vinyl compounds are also present. These polymerizable high boilers present the additional problem of fouling of the surfaces of either a still reboiler or, alternatively, of the heat transfer surfaces and vapor discharge conduits of a simple flash evaporator if an effort is made to simply vaporize the acetic acid containing such materials without first removing them as by distillation.

There is, accordingly a need for a simple and effective method for removing the high-boiling reaction by-products from the recycle acetic acid before it is reintroduced into the vinyl acetate converter.

It is an object of the present invention to provide a method for removing high-boiling reaction by-products from the recycle alkanoic acid, e.g. acetic acid, stream recovered from the reaction product in a process in which vinyl acetate or other alkenyl akanoate is formed by passing ethylene or other alkene, acetic acid or other alkanoic acid, and molecular oxygen over a solid catalyst comprising a noble metal, especially a Group VIII metal, or its oxides or salts. It is another object to provide a method for accomplishing this separation with improved heat economy and with minimal polymer fouling of the interal surfaces of the process apparatus employed. It is yet another object to provide a method whereby said separation can be accomplished by the use of comparatively simple process apparatus. Other objects will be apparent from the following detailed description and example.

Summary of the invention

In accordance with the present invention, as applied for example to the production of vinyl acetate, the acetic acid content of the crude acetic acid cut resulting when vinyl acetate is separated from the higher-boiling components of the catalytic vinyl acetate converter effluent is stripped out of said crude cut, and separated from the higher-boiling reaction by-products which are present therein, by countercurrently contacting the crude acetic acid cut with a heated gas stream comprising ethylene which is to be fed into the catalytic vinyl acetate converter. This is advantageously accomplished by the steps of (a) injecting the ethylene into a heated acetic acid vaporizer, preferably into the heating element of the vaporizer whereby the ethylene is saturated with the acetic acid and (b) introducing the resulting stream of vapor comprising ethylene and acetic acid into the base of a countercurrent stripping column, while (c) introducing the crude acetic acid cut which is to be stripped into the top of the stripping column. From the top of the stripping column there is drawn a vapor comprising ethylene and acetic acid, which is then forwarded to the catalytic converter for production of vinyl acetate. The stripped liquid from the base of the stripping column, comprising the high-boiling by-products of the vinyl acetate synthesis reaction, is disposed of as desired. Advantageously it is allowed to pass into the vaporizer, from which a residue comprising the high-boiling impurities is then withdrawn for work-up as desired, for example to recover additional quantities of acetic acid.

It will be recognized that the ethylene introduced into the vaporizer can be pure, or it can be diluted with other gases, for example nitrogen and other inert gases which may be present in the ethylene-containing gas stream which is recycled to the catalytic converter from the primary product recovery system in which the converter product is separated into liquefiable components (e.g. vinyl acetate and acetic acid) and gaseous components (e.g. ethylene and other fixed gases).

In a particularly suitable embodiment of the invention the stripping column just described is surmounted by a rectification or absorption column section, into the top of which there is introduced a stream of comparatively pure acetic acid, i.e. acetic acid which does not contain appreciable quantities of the high-boiling reaction products which are present in the crude cut introduced into the top of the stripping section. This reduces even further any contamination, by the high-boiling reaction by-products, of the acetic acid-ethylene vapor stream being fed into the vinyl acetate converter.

It will be recognized that this invention is not restricted in its application to processes in which ethylene and acetic acid are being reacted catalytically to form vinyl acetate. It can also be employed in chemically analogous reaction systems in which other lower alkenes such as propylene or the butenes or other unsaturated compounds having more than two and up to about six carbon atoms are reacted with acetic acid or other alkanoic acids, such as propionic acid specifically, in the presence of molecular oxygen and a noble metal-containing solid catalyst to form unsaturated esters of the acid. In all such reactions the formation of high-boiling reaction by-products occurs as in the vinyl acetate process, and the problem and its solution are the same as in the present invention. A specific example is the reaction of propylene and acetic acid to form allyl or isopropenyl acetate, with propylene glycol acetates being one of the higher-boiling by-products to be separated from the recycle acetic acid by the present method. Other diacetoxy propanes will also be present. Dipropionoxy alkanes are formed in analogous systems when propionic acid is employed in place of acetic acid.

Description of the preferred embodiments

With reference to appaartus to be employed, the countercurrent stripping is preferably carried out in a plate-type column, simple perforated plates being particularly suitable, the individual plates being designed in accordance with conventional methods for the liquid and vapor loading to be employed. A packed column can be used if desired, or a series of simple sparged vessels designed for countercurrent contacting of a liquid stream with a vapor stream. Although fewer plates can be employed, if desired, at least about 5 actual operating stripping trays are recommended. In addition, particularly good results obtain when at least about 5 rectification plates are superimposed on the stripping plates, with fresh acetic acid being introduced at the top of this rectification section for the purpose of refluxing downward the compounds higher boiling than acetic acid which are present in the vapors evolved from the top of the stripping section. Although it is preferred, in this arrangement, to maintain at least about 5 stripping trays between the vaporizer and the point at which the crude acetic acid to be stripped is introduced, the crude acid can be introduced at a lower level if desired.

Although failure to do so does not defeat the basic purposes of the invention, it is particularly recommended that the rectification section of the column be designed for minimum liquid entrainment in order to reduce the extent to which compounds less volatile than acetic acid are carried out of the column, for example as mist, in the vaporous ethylene-acetic acid mixture issuing from it. For example, it is advantageous to use in the rectification section sieve-type trays designed and positioned for low liquid carryover. Such trays are easily designed for low pressure drop, which is also highly desirable in this system.

The acetic acid vaporizer can be, if desired, a separate piece of apparatus from the stripping, or rectification and stripping, column just described. Advantageously it comprises a vessel equipped with a heater or reboiler by means of which liquid contained in the vessel is vaporized. Preferably the ethylene-containing gas stream with which the vaporized acetic acid is to be admixed is introduced directly into the lower portion of this heater or reboiler, by which means the circulation rate is enhanced and the gas is readily saturated with the acetic acid vapors. This expedient also, by means of the steam-distillation effect, results in keeping to a minimum the temperatures prevailing in the heater or reboiler.

A particularly recommended arrangement of the column and the vaporizer is one in which the vaporizer and the column constitute a conventional plate-column still, the vaporizer simply comprising the base of the column with its attached reboiler (which is preferably of the thermal siphon type) and with the ethylene-containing gas stream being injected into the base of the reboiler (on its so-called "process" side). With this arrangement the stripped liquid leaving the bottom of the stripping column drains into the liquid circulating through the reboiler, from which it is tapped off, either continuously or intermittently, for workup in, for example, a high-temperature evaporator of the wiped-film type for separating residual acetic acid from the high-boiling compounds and polymers which are present.

It will be recognized that, of the several gases which are contained in the material being fed into the vinyl acetate converter, all or part can be passed through the stripping column assembly just described. Advantageously, the mixture of ethylene, inert gases, and oxygen which recycles from the vinyl acetate product recovery system back to the converter can be employed, with the fresh ethylene makeup required by the vinyl acetate process being incorporated into this stream either before or after the stripping operation. This stream comprises predominantly ethylene, with the remainder being largely inert gases and a small amount (up to 2 or 3% by volume) of oxygen. Exact composition of this stream is not pertinent to the present invention except that as a practical matter it is desirable, of course, to avoid high concentrations of oxygen with the resultant explosion hazard.

Temperature and pressure to be employed in the vaporizer and the column mounted above it can vary over a wide range, although the pressure is conveniently maintained substantially the same as the pressure obtaining in the vinyl acetate converter. That is, the pressure is advantageously equal to the vinyl acetate converter pressure plus sufficient pressure differential to move the vapor evolved from the top of the column through the piping and control valves and similar apparatus intermediate between the column and the vinyl acetate converter. Typically this pressure is in the range of approximately 6 to 10 atmospheres absolute. With the pressure being set in this manner, heat is then supplied to the vaporizer in an amount which is preferably sufficient to vaporize the liquid contained in the vaporizer and evaporate into the gas stream passing through the column all of the acetic acid contained in the recycle acid stream introduced at the top of the stripping section and at least a portion of the acetic acid contained in the fresh acetic acid stream which, in the preferred embodiment of the invention, is introduced into the top of the rectification section. The composition of the liquid contained in the vaporizer, i.e. the liquid circulating through the reboiler, is preferably controlled so that its acetic acid content is at least roughly 50% by weight and preferably between about 70% and about 80% by weight; this control is not critical, but is recommended to prevent buildup of high-boiling compounds in the base to such a degree that the operating temperature becomes high enough to cause undesired thermal decomposition of some of these compounds and fouling of the vaporizer heat transfer surfaces.

Convenient operation of the vaporization apparatus under the above-described conditions of temperature and pressure also obtains when, per unit weight of ethylene-containing gas introduced into the vaporizer, there is introduced into the combined rectification and stripping sections of the column about 0.5 to 0.6 unit weight of acetic acid. It will be recognized that this is not a critical process control parameter; that is, if the gas rate is insufficient to strip the desired quantity of acetic acid out of the liquid phase, the gas rate or the vaporization temperature can be increased, and vice versa.

With regard to the relative proportions of the recycle acetic acid stream introduced at the top of the stripping section of the column and the fresh acetic acid introduced at the top of the rectification section, satisfactory results obtain when the stripping and rectification sections of the column constitute together the equivalent of at least about 10 actual trays, 5 of which are in the stripping section and 5 of which are in the rectification section, with about 15% to 50% of the total introduced acetic acid being introduced into the top of the rectification section and the remainder being introduced at the top of the stripping section (i.e. into the center of the total column).

The following example is given to illustrate the invention further. It will be recognized that many variations can be made therefrom within the scope of the invention.

EXAMPLE I

The stripping of a crude recycle acetic acid stream, including rectification of the stripped vapors with fresh acetic acid, was carried out in a 10-tray bubble cap column which was 6 inches in diameter and which was equipped with a vertical thermosiphon reboiler having two tubes 6 feet long and 1 inch in diameter. The column was operated at a pressure of 6.7 atmospheres absolute. Temperature in the base of the column was 265° F.; in the head of the column the temperature was 250° F. Onto the top tray of the column, fresh acetic free of contaminants other than about 0.1 weight percent water was introduced at a rate of 8.60 pounds per hour. Onto the fifth tray of the column there was continuously introduced 35.2 pounds per hour of a crude acetic acid cut which had been obtained by azeotropically distilling vinyl acetate and lighter reaction by-products from the converter effluent formed by passing vapors of acetic acid along with ethylene and oxygen over a solid catalyst comprising metallic palladium on an amorphous silica support along with potassium acetate. This recycle acetic acid cut contained, by weight, 95.4% acetic acid, 1.60% water, 0.44% non-volatiles including vinyl-type polymers, and 2.0 to 2.5% high-boiling by-products of the vinyl acetate synthesis reaction comprising high-boiling acetate esters including acetoxyvinyl acetate.

Into the lower head of the column reboiler there was continuously introduced a gas stream, composed of the ethylene-containing recycle gas stream resulting from the vinyl acetate synthesis operation together with makeup fresh ethylene and comprising predominantly ethylene with lesser amounts of inert gases such as nitrogen along with small amounts (less than about 3 volume percent) of oxygen.

Heat was supplied to the reboiler at a rate such that there was evolved from the head of the column, at the rate of 123.1 pounds per hour, a gaseous mixture consisting of the above-described gas stream now saturated with acetic acid at 250° F., while there was produced from the bottom of the column a stripped residue stream amounting to 4.49 pounds per hour. The acetic acid-ethylene stream evolved from the head of the column, which was suitable for incorporation into the feed system of the vinyl acetate converter, contained, by weight, less than 378 parts per million of heavy ends, defined as compounds having a boiling point higher than that of acetic acid.

The residue stream withdrawn from the base of the column contained, by weight, 0.9% ethylene, 0.08% water, 77.5% acetic acid, 2.29% polymers, and 19.2% heavy ends. This withdrawn residue stream was subsequently processed through a high-temperature wiped-film evaporator to recover a final residue comprising heavy ends still containing some acetic acid, and a distillate comprising a crude acetic acid.

The embodiments of the invention in which an exclusive property or privilege is claimed are defined as follows:

1. In a process which comprises introducing a liquid lower alkanoic acid selected from the group consisting of acetic acid and propionic acid and a continuous stream of fixed gas comprising predominantly a lower alkene of up to about six carbon atoms into a heated vaporization apparatus; continuously vaporizing at least a portion of said alkanoic acid into said alkene stream in said apparatus; withdrawing from said apparatus a gaseous mixture comprising predominantly said alkene and alkanoic acid; passing said gaseous mixture in admixture with molecular oxygen through a catalytic converter containing a Group VIII noble metal catalyst; reacting said alkene, alkanoic acid, and oxygen in the vapor phase, in said converter in the presence of said catalyst to form an alkenyl alkanoate; continuously withdrawing from said converter a gaseous product comprising said alkene, an alkenyl alkanoate, alkanoic acid, and high-boiling by-products; separating said gaseous product into a fixed-gas component comprising predominantly said alkene and a liquid component comprising alkanoic acid, an alkenyl alkanoate, and high-boiling by-products; recovering said alkenyl alkanoate as distillate from said liquid component by distillation while recovering alkanoic acid and said high-boiling by-products as the residue stream from said distillation; and utilizing said residue stream as a source of alkanoic acid to be recycled to said catalytic converter, the improvement which comprises:

stripping alkanoic acid from said distillation residue stream, and incorporating said stripped-out alkanoic acid into said gaseous mixture which is to be passed through said converter, by countercurrently stripping said distillation residue stream with the gaseous mixture comprising alkanoic acid and said alkene being withdrawn from said vaporization apparatus.

2. In a process which comprises introducing liquid acetic acid and a continuous stream of fixed gas comprising predominantly ethylene into a heated vaporization apparatus; continuously vaporizing at least a portion of said acetic acid into said ethylene stream in said apparatus; withdrawing from said apparatus a gaseous mixture comprising predominantly ethylene and acetic acid; passing said gaseous mixture in admixture with molecular oxygen through a catalytic converter containing a Group VIII noble metal catalyst; reacting ethylene, acetic acid, and oxygen in the vapor phase, in said converter in the presence of said catalyst of form vinyl acetate; continuously withdrawing from said converter a gaseous product comprising ethylene, vinyl acetate, acetic acid, and high-boiling by-products including acetoxyvinyl acetate; separating said gaseous product into a fixed-gas component comprising predominantly ethylene and a liquid component comprising acetic acid, vinyl acetate, and high-boiling by-products; recovering vinyl acetate as distillate from said liquid component by water-azeotropic distillation while recovering acetic acid and said high-boiling by-products as the residue stream from said azeotropic distillation; and utilizing said residue stream as a source of acetic acid to be recycled to said catalytic converter, the improvement which comprises:

stripping acetic acid from said azeotropic distillation residue stream, and incorporating said stripped-out acetic acid into said gaseous mixture which is to be passed through said converter, by countercurrently stripping said azeotropic distillation residue stream with the gaseous mixture comprising acetic acid and ethylene being withdrawn from said vaporization apparatus.

3. The improvement of claim 2 further characterized in that the stripped liquid residue resulting from countercurrently stripping said azeotropic distillation residue with said gaseous mixture comprising ethylene and acetic acid is allowed to pass into said vaporization apparatus, from which there is ultimately withdrawn a liquid vaporization residue comprising acetic acid and said high-boiling by-products.

4. The improvement of claim 3 further characterized by carrying out said countercurrent stripping by continuously introducing said azeotropic distillation residue into the upper end of a stripping column while continuously introducing said gaseous mixture comprising ethylene and acetic acid from said vaporization apparatus into the lower portion of said stripping column and forwarding stripped liquid from the base of said column to said vaporization apparatus.

5. The improvement of claim 4 further characterized in that a rectification section is superimposed atop said stripping column, with fresh acetic acid substantially free of said high-boiling reaction by-products being introduced into the top of said rectification section.

6. The improvement of claim 5 further characterized in that the pressure maintained in said vaporization apparatus and said column is substantially the same as that prevailing in said catalytic converter and heat is supplied to said reboiler in an amount and at a temperature sufficient to vaporize all of the acetic acid contained in said stripped azeotropic distillation residue stream while maintaining in said vaporizer enough liquid acetic acid to provide a vaporization residue containing at least about 50% acetic acid by weight.

7. The improved process of claim 6 wherein the vaporization apparatus and the column are operated at a pressure of about 6 to 10 atmospheres; heat is supplied to the vaporizer in an amount sufficient to control the acetic acid content of the vaporization residue between about 70% and about 80% by weight; and per unit weight of ethylene-comprising fixed gas introduced into the vaporizer there is introduced into the combined rectification and stripping sections of the column about 0.5 to 0.6 unit weight of acetic acid.

8. The improved process of claim 7 wherein the stripping and rectification sections of the column constitute together the equivalent of at least about 10 trays, of which at least about 5 are in the stripping section and at least about 5 in the rectification section, with about 15% to 50% of the total introduced acetic acid being introduced into the top of the column and the remainder being introduced at the top of the stripping section.

References Cited

UNITED STATES PATENTS

| | | | |
|---|---|---|---|
| 3,418,215 | 12/1968 | Nirenberg | 203—49 |
| 2,658,914 | 11/1953 | Rigon | 260—546 |

LORRAINE A. WEINBERGER, Primary Examiner

R. D. KELLY, Assistant Examiner

U.S. Cl. X.R.

203—49, 71